United States Patent [19]

West

[11] Patent Number: 4,936,624
[45] Date of Patent: Jun. 26, 1990

[54] TOOL BOX ASSEMBLY

[76] Inventor: Dwayne K. West, P.O. Box 618, Dumas, Tex. 79029

[21] Appl. No.: 339,062

[22] Filed: Apr. 17, 1989

[51] Int. Cl.⁵ .............................................. B60R 11/06
[52] U.S. Cl. .................................. 296/37.6; 224/282; 224/42.42; 312/DIG. 33
[58] Field of Search ...................... 296/37.6; 224/42.42, 224/273, 282; 312/276, 324, 319, DIG. 33

[56] References Cited

U.S. PATENT DOCUMENTS

| | | | |
|---|---|---|---|
| 1,510,763 | 10/1924 | Canal | 312/324 X |
| 1,659,929 | 2/1928 | Trout | 414/462 |
| 2,629,644 | 2/1953 | Heys | 312/324 X |
| 2,738,250 | 3/1956 | Mele et al. | 312/276 |
| 3,854,621 | 12/1974 | Parry | 220/20 |
| 4,085,961 | 4/1978 | Brown | 296/37.6 |
| 4,266,835 | 5/1981 | Schmidt | 312/244 |
| 4,288,011 | 9/1981 | Grossman | 224/42.42 |
| 4,357,046 | 11/1982 | Lalanne | 296/37.16 |
| 4,389,077 | 6/1983 | Schmidt | 312/DIG. 33 X |
| 4,462,630 | 7/1984 | Omata | 296/37.9 |
| 4,469,364 | 9/1984 | Rafi-Zadeh | 224/42.42 X |
| 4,674,665 | 6/1987 | Van Kirk | 224/273 |
| 4,750,773 | 6/1988 | Chapline et al. | 296/37.6 |

FOREIGN PATENT DOCUMENTS

| | | | |
|---|---|---|---|
| 110186 | 7/1982 | Japan | 296/37.9 |
| 279660 | 11/1927 | United Kingdom | 312/276 |

Primary Examiner—Dennis H. Pedder

[57] ABSTRACT

A tool box assembly for installation in pickup trucks is provided. A pair of tool boxes are pivotally mounted in an enclosed frame for movement between an access position and a secured position. The movement of the tool boxes is driven by a hydraulic system. In the access position, the tool boxes are supported in an open position above the sidewall of the truck. In the secured position, the tool boxes are enclosed completely by the frame which does not extend above the sidewalls of the truck. As the boxes are raised, the lids are opened. When the boxes are lowered, the lids are closed and locked in a closed position.

16 Claims, 3 Drawing Sheets

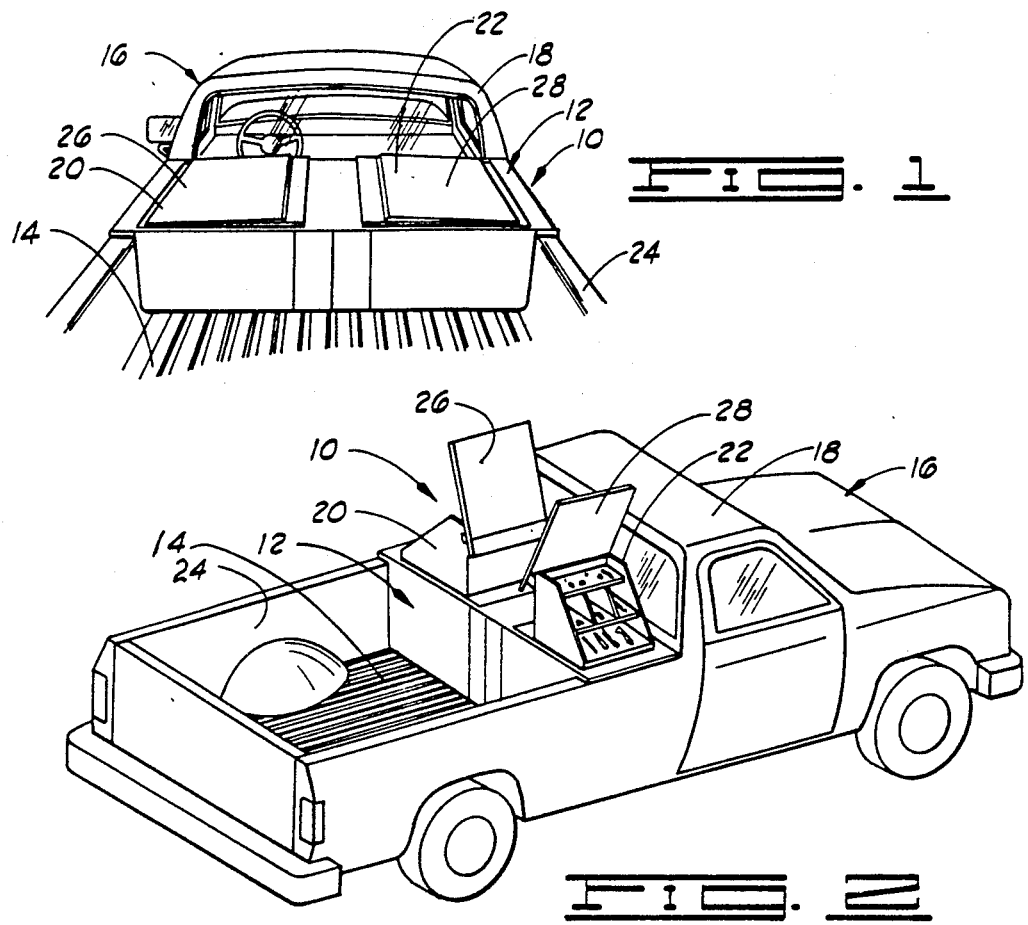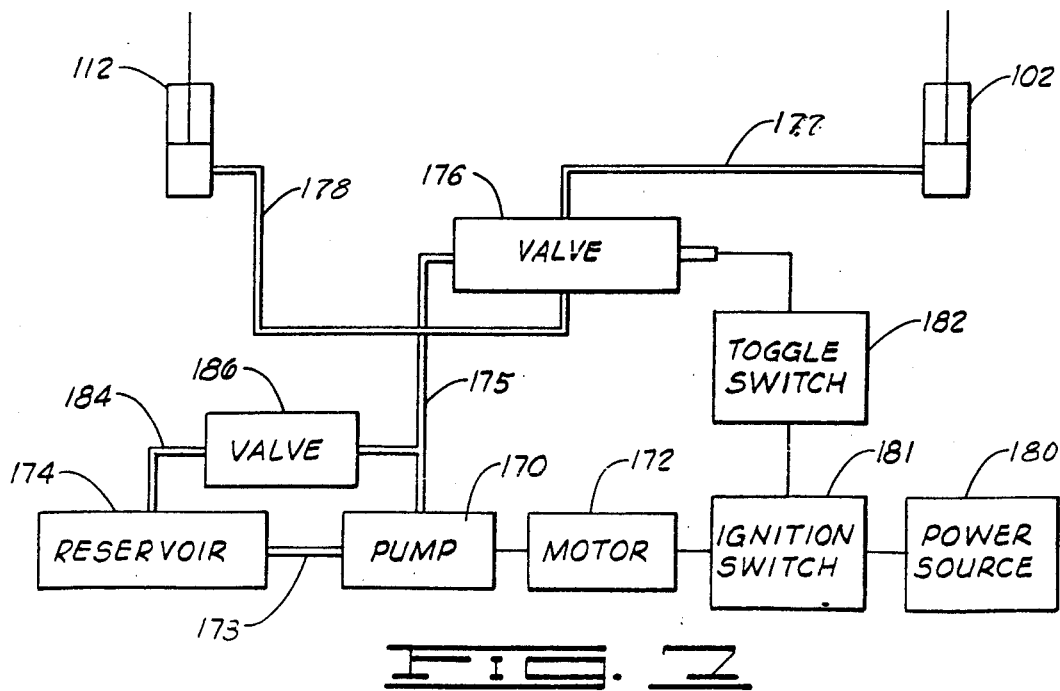

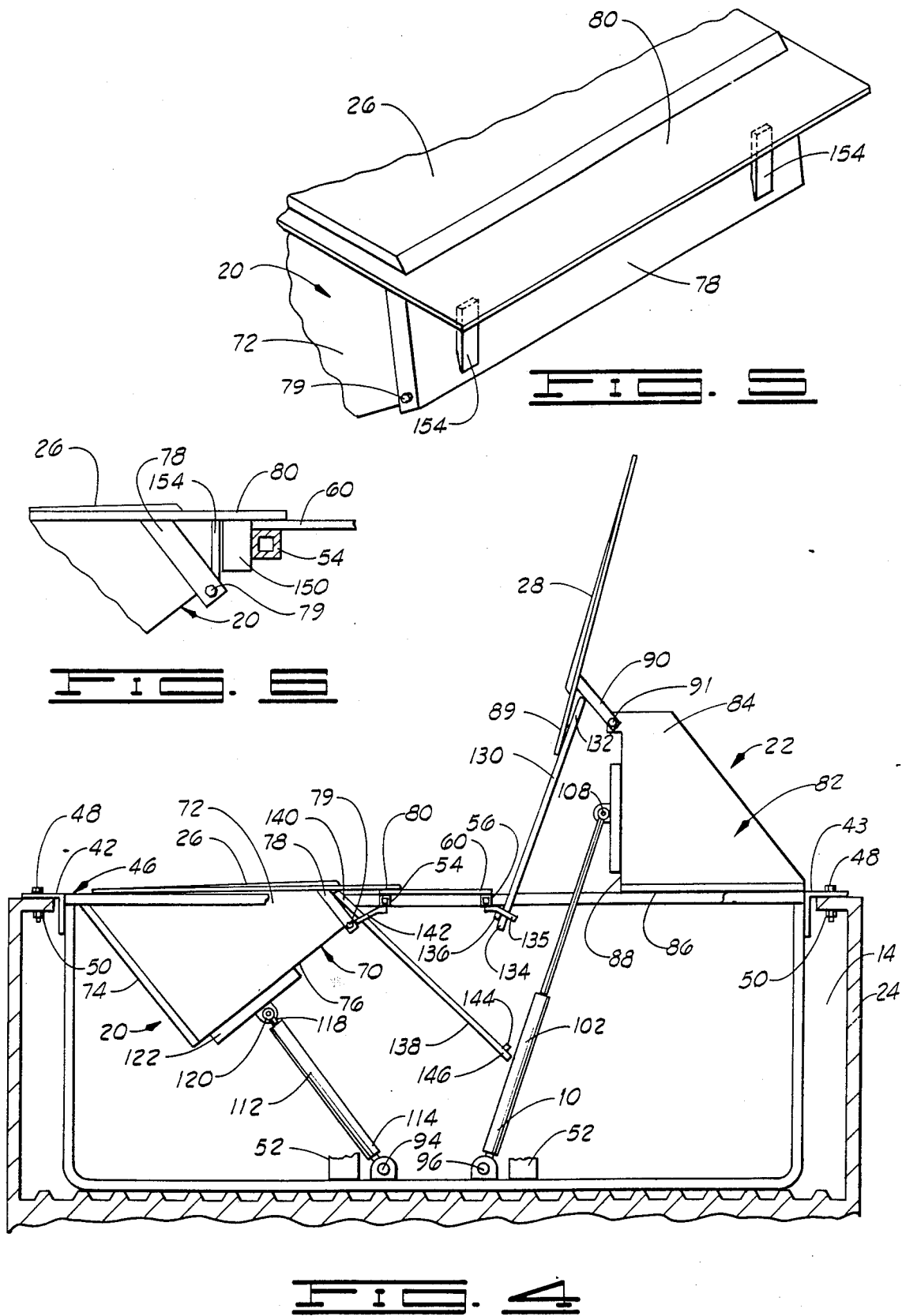

TOOL BOX ASSEMBLY

FIELD OF THE INVENTION

The present invention relates generally to storage receptacles and particularly to tool box assemblies for trucks.

SUMMARY OF THE INVENTION

The present invention comprises a storage receptacle assembly. The assembly comprises a receptable supported in a frame having an upper edge and adapted for installation in a truck. The receptacle is defined in part by a front wall and a back wall, each having an upper edge. A lid is pivotally connected to the upper edge of the back wall for movement between an open and a closed position, and the upper edge of the front wall is pivotally connected to the upper edge of the frame. A mechanism is provided for driving the movement of the receptacle about the pivotal connection between the frame and the front wall and between a secured position and an access position. In the access position the receptacle is supported above the upper edge of the frame, and in the secured position the receptacle is enclosed in the frame.

The present invention further comprises a tool box assembly. The assembly includes a frame having an upper edge. At least one tool box is supported in the frame for pivotal movement between a secured position and an access position. The tool box comprises a body with an open upper end for providing access to the box. The body has a front wall and a back wall, each with an upper edge. The upper edge of the front wall of the box is pivotally connected to the upper edge of the frame. In the access position, the open upper end is supported above the upper edge of the frame. In the secured position, the tool box is enclosed by the frame.

Still further, the present invention comprises a tool box assembly for a truck. The assembly comprises a frame adapted for installation in the cargo area of a truck. A tool box is supported in the frame for movement between an access position and a secured position. A mechanism is included for driving the movement of the tool box.

BRIEF DESCRIPTION OF THE DRAWINGS

FIG. 1 is rear perspective view of a tool box assembly in accordance with the present invention and mounted in the bed of a pickup truck.

FIG. 2 is a side perspective view showing the tool boxes in the assembly of FIG. 1 with the tool boxes in the access position.

FIG. 4 is a front elevational view of the tool box assembly. The front cover panels and the lid locking mechanisms have been removed.

FIG. 5 is an enlarged, fragmented perspective view of the rear of the left tool box.

FIG. 6 is a fragmented, side elevational view of the left tool box in the secured position showing the lid locking mechanism.

FIG. 7 is a schematic drawing of the electrical and hydraulic components of the assembly which drive the movement of the tool boxes.

DETAILED DESCRIPTION OF THE PREFERRED EMBODIMENT

Figure 3:
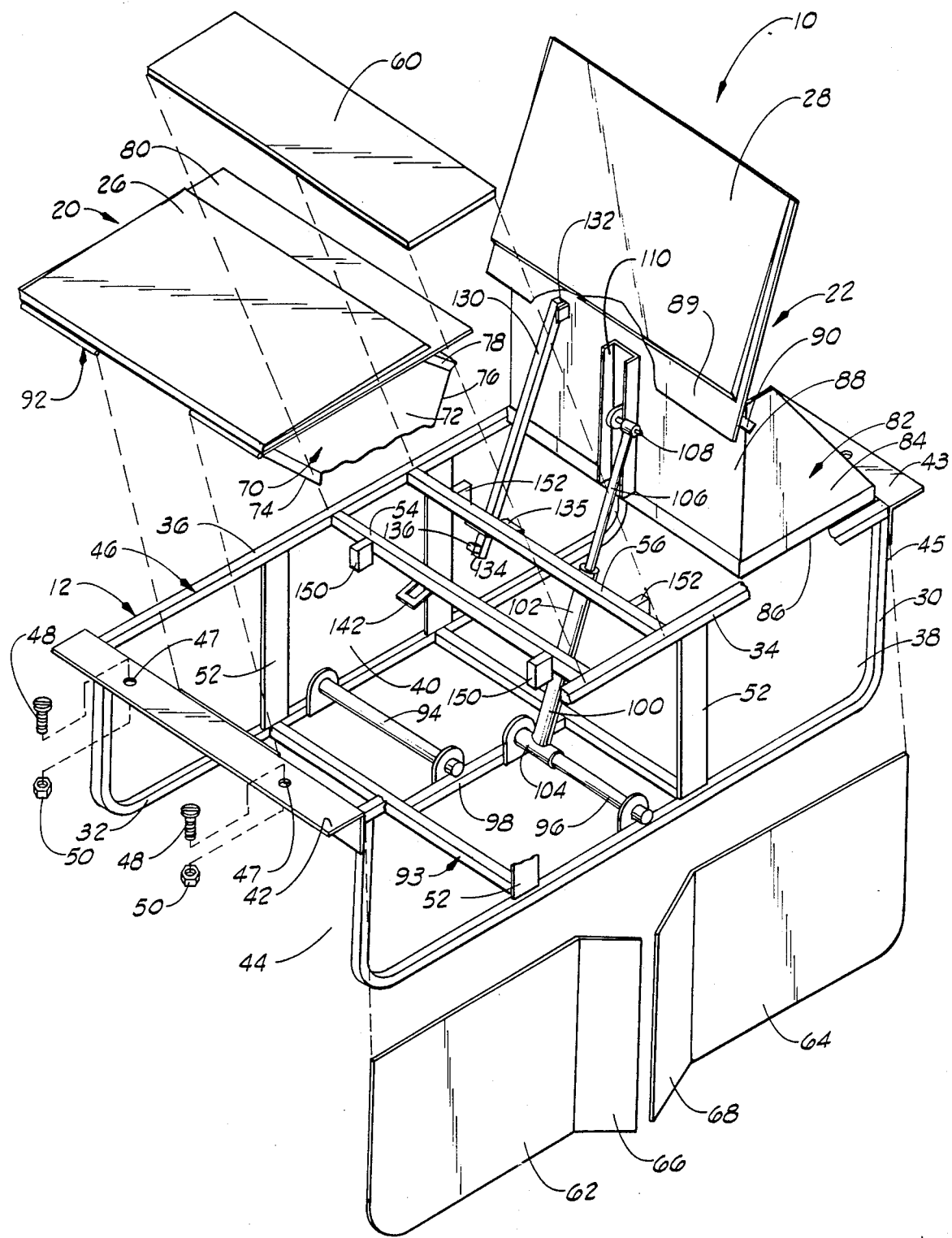
FIG. 3 is an enlarged, exploded and fragmented perspective view of the tool box assembly.

Tool box assemblies adapted for installation in the cargo areas of pickup trucks are becoming increasingly popular. These assemblies provide a convenient and secure storage receptacle for tools and other articles which must be transported frequently. The tool box assembly of this invention permits access to the contents of the tool boxes from the side of the pickup by supporting the tool boxes in an open position above the upper edge of the sidewall. Moreover, in the preferred construction of this assembly, the movement of the tool boxes between this open position to a closed or secured position inside a protective frame is mechanically driven. Other features and advantages of this assembly will be apparent.

Turning now to the figures in general and to FIG. 1 in particular, shown therein and designated by the reference numeral 10 is a tool box assembly. The assembly 10 comprises a frame 12 adapted for installation in the bed or cargo area 14 of a truck 16.

As used herein, the term "truck" is intended to include any vehicle having an area, enclosed or open, adapted for storage or transport of cargo of any kind. Thus, the term "truck" includes pickup trucks, such as the one depicted in the figures, as well as vans, flatbed trucks and various other private and commercial vehicles.

When used in a pickup truck, the assembly 10 preferably is mountable in the forward end of the cargo area 14, that is, adjacent the rear of the passenger compartment or cab 18 of the truck 16. However, the placement of the assembly may be varied.

With reference next to FIG. 2, at least one and preferably two tool boxes 20 and 22 are supported in the frame 12. The boxes 20 and 22 are supported for movement between an access position (FIG. 2) and a secured position (FIG. 1). In the access position, the tool boxes 20 and 22 are supported above the frame 12 and at the level of the sidewall 24 of the truck 16. In the secured position, the lids 26 and 28 of the tool boxes 20 and 22 are closed and the boxes 20 and 22 are completely enclosed in the frame 12.

The detailed construction of the assembly 10 is shown in FIGS. 3-7. Referring first to FIG. 3, the frame 12 comprises a pair of opposing U-shaped members 30 and 32. The upper ends of the members 30 and 32 are connected by the longitudinal members 34 and 36. Thus, the U-shaped member 30 and the longitudinal member 34 define the front 38 of the frame 12, and the U-shaped member 32 and the longitudinal member 36 define the rear 40 of the frame 12.

End members 42 and 43 connect opposing upper ends of the U-shaped members 30 and 32. The end members 42 and 43 and the vertical portions of the U-shaped members 30 and 32 then define the ends 44 and 45 of the frame 12. The end members 42 and 43 and longitudinal members 34 and 36 define the upper edges of the top 46 of the frame 12.

The end members preferably are flat, angled pieces, and are adapted to fit over and be connected to the sidewalls 24 of the truck 16. To this end, holes 47 are provided in the end members 42 and 43, and a nut 48 and bolt 50 are included for each such hole for removably but securely mounting the frame 12 in the truck.

The shape of the U-shaped members 30 and 32 preferably conforms generally to the inner contour of the cargo area 14, as best seen in FIGS. 1 and 4. The height of the frame 12, which in this embodiment is the length of the vertical portions of the U-shaped members 30 and 32, should be about the same as the depth of the cargo area 14. In this way, when the assembly 12 is installed in the truck 16, the weight of the assembly is supported by the floor of the cargo area. Yet, the top 16 of the frame 12 does not extend substantially above the sidewalls 24.

For vertical support, one or more vertical members 52 may be fixed between the longitudinal members 34 and 36 and the bottom portions of the U-shaped members 30 and 32. A pair of cross members 54 and 56 are fixed between the longitudinal members 34 and 36 generally in the center of the frame 12 for supporting other components of the assembly yet to be described.

With reference still to FIG. 3, a top cove panel 60 is fixed across the center portions of the longitudinal members 34 and 36 generally over the cross members 54 and 56. A pair of front cover panels 62 and 64 are attached over the front 38 of the frame 12. The front panels 62 and 64 include doors 66 and 68 for permitting access to the inside of the frame 12. It will be appreciated that the vertical members 52 on the front 38 of the frame 12 should be positioned so that they do not obstruct the opening formed by the doors 66 and 68.

The rear 40 and ends 44 and 45 may be covered. However, it will be understood that in the embodiment shown herein such panels are not necessary, as these aspects of the frame 12 are enclosed when the frame is installed in the truck.

The tool boxes 20 and 22 preferably are constructed substantially in accordance with the teachings of U.S. Pat. No. 4,266,835, issued on May 12, 1981 in the name of Schmidt, and the entire contents of that patent are incorporated herein by reference. These tool boxes are commercially available and are manufactured by Montezuma Welding (Montezuma, Kans.).

As shown in FIGS. 3-6, the tool box 20 generally comprises a body 70 defined by a pair of parallel triangularly shaped sidewalls 72, a front wall 74 and a back wall 76. The lid 26 has an oblique spine 78 which is pivotally connected to hinges 79, to the upper edge of the back wall 76. The lid 26 has a skirt 80 which overlaps the top cover panel 60 and the longitudinal members 34 and 36, when the box is in the secured position (FIG. 1). Similarly, the tool box 22 comprises a body 82 having sidewalls 84, a front wall 88 and a back wall 88. The lid 28 has a skirt 89 and spine 90 which is pivotally connected by hinges 91 to the upper edge of the back wall 88.

As seen in FIG. 3, the upper edge of each of the front wall 74 of the box 20 is pivotally connected to the end member 42, by a hinge 92. A hinge (not shown) likewise connects the front wall 88 of the box 22 to the end member 43. Pivotation of the boxes about this connection moves the boxes between a position in which the bodies of the boxes are completely enclosed with the frame (secured position) and a position in which the box is above the sidewall of the truck (FIG. 4).

Preferably, this movement of the boxes 20 and 22 between the secured position and the access position is driven mechanically. One suitable mechanism is the hydraulic system shown. However, it will be understood that a variety of other suitable mechanism are available. For example, an electric servo motor assembly could be employed. Moreover, while a power driven mechanism is preferred, in some instances manually operated devices, such as a gear and crank apparatus, may be utilized.

Referring still to FIG. 3, an H-shaped member 93 is provided at the bottom of the frame 12 attached between the U-shaped members 30 and 32. This H-shaped member provides a base on which to mount the motor, pump and reservoir components of the hydraulic system. However, these components are not shown FIGS. 3-6 so that the structure and operation of the assembly 10 can be more easily understood.

Pivot bars 94 and 96 are mounted at the bottom of the frame 12 between the crossbar 98 of the H-shaped support 93 and the inner aspects of the U-shaped members 30 and 32. The lower end 100 of a hydraulic cylinder 102 is pivotally connected to the pivot bar 96 by a sleeve 104. The rod 106 of the cylinder 102 is pivotally attached to a connector 108 fixed on the back wall 88 of the box 22. A U-shaped strip 110 may be attached on the back wall 88 for additional support where the rod 107 attaches.

In like manner, and as shown in FIG. 4, the box 20 is supported in the frame 12 by a hydraulic cylinder 112 having its lower end 114 pivotally attached to the pivot bar 94 by a sleeve (not shown), and its rod 118 pivotally connected to a connector 120 mounted on a reinforcing U-shaped strip 122 on the back wall 76 of the box 20.

The position and travel of the cylinders are selected so that when the rods are retracted the boxes are pulled inside the frame until the lids rest on the top cover panel, and when the rods are extended the boxes are pushed up until the front walls of the boxes parallel to the longitudinal members.

Referring still to FIGS. 3 and 4, the assembly 10 further comprises a device for opening the lids when the boxes are raised to the access position. For this purpose, the box 22 is equipped with a pull rod 130, one end of which is pivotally attached at some point on the spine 89 of the lid 28. The other end 134 is free, but the body of the pull rod 130 is slidably received in a guide 135 mounted on the underside of the cross member 56. A stop 136 (FIG. 4) on the free end 134 of the rod 134 prevents the rod from being pulled through the guide 135. Likewise, as shown in FIG. 4, a pull rod 138 is pivotally connected at its upper end 140 to the spine 78 of the lid 28 of the box 20. The rod 138 is slidably received in a guide 142 mounted under the cross member 54, and a stop 144 is formed on the free end 146 of the pull rod 138.

The length of each pull rod is selected so that at a point before the box reaches the fully upright position, the stop engages the guide causing the rod to pull on the lid. As the box completes is pivot path, the rod pulls the lid open. Conversely, as the box descends back into the frame, the rod slides back through the guide allowing the lid to close again.

Locking mechanism preferably are included in the assembly 10 for locking the lids 26 and 28 in the closed position when the boxes 20 and 22 are in the secured position. This can be accomplished by affixing a pair of blocks 150 and 152 on each cross member 54 and 56, respectively (FIG. 3). As shown in FIG. 5, a pair of strips 154 is mounted between the skirt 80 and the lid 26. As shown in FIG. 6, when the box 20 is in the secured position and the lid 26 is closed, the block 150 on the cross bar 54 engages the strip 154 and the under surface of the lid 80. With these elements thus engaged, the lid 26 cannot be opened without great difficulty. It will be understood that the box 22 is similarly provided with a pair strips (not shown) to engage the blocks 152 on the cross bar 56 (FIG. 3).

The hydraulic and electric components employed in this embodiment to drive the movement of the tool boxes 20 and 22 are illustrated schematically in the FIG. 6, to which attention now is directed. A pump 170 powered by a motor 172 is fluidly connected by a conduit 173 to a reservoir 174 containing hydraulic fluid. These components are sold commercially as a unit. The pump 170 is fluidly connected by the conduit 175 to a flow valve 176, such as a solenoid valve, for directing the flow of hydraulic fluid from the pump 170 to the cylinder 102 through the conduit 177 or to the cylinder 112 through the conduit 178.

The motor 172 is electrically connected to a power source which preferably is a battery 180, and which most preferably is the 12-volt battery in the engine of the truck in which the assembly is installed. A first switch 181, such as an ignition switch, is provided for controlling the flow of electricity to the flow valve 176 and for running the motor 172. Accordingly, this switch is operable between an "off" position in which the circuit to the battery 180 is interrupted, an "on" position in which the circuit to the battery 180 is closed, and a "start" position in which the pump is activated for driving the hydraulic system. Because this switch is most conveniently mounted on the outside of the frame, a key operated switch will be preferred as this will help prevent unauthorized operation of the assembly 10 and access to the contents of the boxes 20 and 22.

A second switch 182, such as a toggle switch, is provided for operating the flow valve 176. When the switch is in the "on" position, power is supplied to the valve 176 maintaining it in a first position whereby flow of hydraulic fluid is directed to the cylinder 102. When the switch 182 is in the "off" position, no power is available to the flow valve 176, and it returns to a second position whereby flow of hydraulic fluid is directed to the cylinder 112. It will be understood that the first switch 181 must be in the "on" position to provide power to the flow valve 176. The switch 182 is mounted most conveniently near the key ignition switch 181.

Return of hydraulic fluid to the reservoir 174 occurs through a conduit 184 which is controlled by a valve 186, such as a ball valve. Thus, when the valve 186 is open, fluid from the cylinders is permitted to drain back into the reservoir 174. A manual control (not shown) of some sort should be included for opening and closing the valve 186. The manual control preferably is mounted near the switches 181 and 182.

To operate the assembly, the toggle switch 182 is turned to the "off" or the "on" position depending on which of the boxes is to be raised first. Next, the ignition switch 181 is turned to the "start" position to activate the hydraulic pump 170 and held there until the selected box has risen to the fully upright position. To raise the other tool box, the toggle switch 182 is turned to its alternate position. This switches the flow valve 176 which redirects the fluid flow to the cylinder which supports the other box. When the second box has ben raised to the desired position, the ignition switch 181 may be released, allowing it to return to the "on" position.

The boxes will remain in the up (access) position until the return valve 186 is opened. To lower a tool box, the toggle switch 182 is moved, if necessary, to permit emptying of the selected cylinder. The key ignition switch 181 must be in the "on" position to operate the toggle switch 186 in the "on" position. To lower the other tool box, the toggle switch 182 is turned to the other position and the second cylinder is allowed to drain. Finally, the key is removed from the ignition switch 181.

Now it will be appreciated that the present invention provides a convenient tool box assembly especially suitable for installation in a transport vehicle, such as a truck, and particularly suitable for installation in the cargo area of a pickup truck. Each tool box in the assembly is movable between an access position and a secured position.

As the box is raised to the access position, the lid of the box opens automatically and the box is brought to a position above the sidewall of the pickup. In this way, the contents of the box are easily reached from a standing position at the side of the truck.

As the box is lowered to the secured position, the lid closes automatically. The lid locking mechanism is engaged automatically when the box is in the secured position and prevents the lid from being opened.

The movement of the tool boxes in the assembly is power driven. Thus, the strain of lifting the weight of a filled tool box is eliminated. Thus, the mechanically driven operation of the assembly of this invention is a safety factor as it makes physical injuries common to lifting activities less likely.

The overall assembly is compact. It fits snugly and securely in the cargo area of a pickup and the top of the assembly is level with the top of the sidewalls of the truck. This feature is particularly advantageous in that a truck in which in this assembly is installed may used to pull a "fifth wheel" trailer. The top of the assembly does not obstruct or interfere with the forward portion of any such trailer.

The simple construction of the frame in combination with the configuration of the tool box protects the contents of the boxes from water and dust intrusion. The exterior of the assembly is unobtrusive and does not detract from the appearance of the truck.

Changes may be made in the combination and arrangement of the various parts, elements, steps and procedures described herein without departing from the spirit and scope of the invention as defined in the following claims.

What is claimed is:

1. A tool box assembly for a truck, comprising:
   a frame adapted for installation in the cargo area of the truck;
   a tool box supported in the frame for movement between an access position and a secured position; and
   means for imparting a driving force for movement of the tool box.

2. The tool box assembly of claim 1 wherein there are a pair of tool boxes supported in the frame and wherein the means for driving the movement of the tool boxes permits the tool boxes to be operated independently.

3. The tool box assembly of claim 1 wherein the driving means is a hydraulic system.

4. The tool box assembly of claim 1 wherein the truck is a pickup truck having a cargo area defined in part by a pair of sidewalls, and wherein the assembly does not extend substantially above the sidewalls when the box is in the secured position.

5. The tool box assembly of claim 1 wherein the tool box comprises a body and a lid, the lid being operable between an open and a closed position, and wherein the assembly further comprises:

means for locking the lid in the closed position when the box is in the secured position, such means being activated by movement of the box into the secured position.

6. The tool box assembly of claim 1 further comprising:
a lid mounted on the tool box; and
means for opening the lid as the box is moved to the access position and for closing the lid as the box is moved to the secured position.

7. A tool box assembly, comprising:
a frame having an upper edge; and
a tool box supported in the frame for movement between
a secured position in which the receptacle is enclosed by the frame and an access position in which the receptacle is supported above the frame, wherein the tool box comprises a body having an open upper end for providing access to the box, and having in the secured position a front wall and a back wall, each having an upper edge, and wherein the box is supported in the frame by a pivotal connection between the upper edge of the front wall of the box and the upper edge of the frame; and
means for imparting a driving force for movement of the box between the access position and the secured position.

8. The tool box assembly of claim 7 wherein the driving means is a hydraulic system.

9. The tool box assembly of claim 7 wherein the box comprises a lid and wherein the assembly further comprises:
means for locking the lid in the closed position when the box is in the secured position, such means being engaged by movement of the box into the secured position.

10. The tool box assembly of claim 7 wherein a pair of tool boxes are supported in the frame.

11. The tool box assembly of claim 7 wherein the box comprises a lid and wherein the assembly further comprises:
means for opening the lid when the box is moved to the access position and closing the lid when the box is moved to the secured position.

12. A storage receptacle assembly, comprising:
a frame having an upper edge and being adapted for installation in a truck;
a storage receptacle supported in the frame for movement between a secured position in which the receptacle is enclosed by the frame and an excess position in which the receptacle is supported above the frame, the receptacle defined at least in part by having in the secured position a front wall and a back wall, each having an upper edge, and a lid pivotally connected to the upper edge of the back wall for movement between an open and a closed position, and wherein the upper edge of the front wall is pivotally connected to the upper edge of the frame; and
means for imparting a driving force for movement of the receptacle about the pivotal connection between the upper edge of the front wall and the upper edge of the frame, such movement being between the secured position and the access position.

13. The storage receptacle of claim 12 further comprising:
means for opening the lid of the receptacle while the receptacle is being moved toward the access position.

14. The storage receptacle assembly of claim 12 further comprising:
means for locking the lid in the closed position and wherein such lid locking means is activated by placement of the receptacle in the secured position.

15. The storage receptacle assembly of claim 12 wherein the driving means is a hydraulic system.

16. The storage receptacle assembly of claim 12 wherein a pair of receptacles are supported in the frame.

* * * * *

UNITED STATES PATENT AND TRADEMARK OFFICE
CERTIFICATE OF CORRECTION

PATENT NO. : 4,936,624
DATED : June 26, 1990
INVENTOR(S) : Dwayne K. West

It is certified that error appears in the above—identified patent and that said Letters Patent is hereby corrected as shown below:

Col. 3, line 43, please delete the words "to hinges" and substitute therefor --by hinges--.

Col. 3, line 48, please delete the words "a front wall 88" and substitute therefor --a front wall 86--.

Col. 3, line 55, please delete the numeral "88" and substitute therefor --86--.

Col. 4, line 45, please delete the numeral "28" and substitute therefor --26--.

Signed and Sealed this

First Day of October, 1991

Attest:

HARRY F. MANBECK, JR.

*Attesting Officer*  *Commissioner of Patents and Trademarks*